(12) United States Patent
Wittmershaus

(10) Patent No.: US 8,641,132 B2
(45) Date of Patent: Feb. 4, 2014

(54) HYDRAULICALLY DAMPING MOUNT AND MOTOR VEHICLE WITH IT

(75) Inventor: Volker Wittmershaus, Birkenau (DE)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 13/563,912

(22) Filed: Aug. 1, 2012

(65) Prior Publication Data

US 2013/0033054 A1 Feb. 7, 2013

(30) Foreign Application Priority Data

Aug. 2, 2011 (DE) .......................... 10 2011 109 128

(51) Int. Cl.
*B60J 7/00* (2006.01)

(52) U.S. Cl.
USPC .................................. 296/190.07; 267/141.4

(58) Field of Classification Search
USPC ..................................................... 296/190.07
See application file for complete search history.

(56) References Cited

U.S. PATENT DOCUMENTS

| 5,577,716 A | 11/1996 | Hamaekers et al. |
| 6,416,102 B1 * | 7/2002 | Howard ....................... 296/35.1 |
| 7,188,828 B2 * | 3/2007 | Rudolf et al. ............ 267/140.13 |
| 2012/0205846 A1 | 8/2012 | Schaefer |

FOREIGN PATENT DOCUMENTS

| DE | 4033519 A1 | 4/1992 |
| DE | 102009054881 A1 | 6/2011 |

* cited by examiner

*Primary Examiner* — Joseph Pape
*Assistant Examiner* — Dana Ivey
(74) *Attorney, Agent, or Firm* — Leydig, Voit & Mayer, Ltd.

(57) ABSTRACT

A hydraulically damping mount includes a support bearing and a seat which are supported on each other by a hollow conical spring element made of an elastomeric material. The support bearing is shaped essentially as a double-T and includes two annular radial flanges that are connected to each other via a centrally positioned connecting tube so as to be adjacent to each other at an axial distance from each other and so as to delimit the mount on a front on both sides. A working chamber and a compensation chamber are filled with damping fluid and are separated from each other, on respective axially facing sides, via a partition having a damping channel which connects the chambers to each other so as to convey the fluid. The partition is joined to the seat and has an annular shape that surrounds and seals the connection tube.

14 Claims, 1 Drawing Sheet

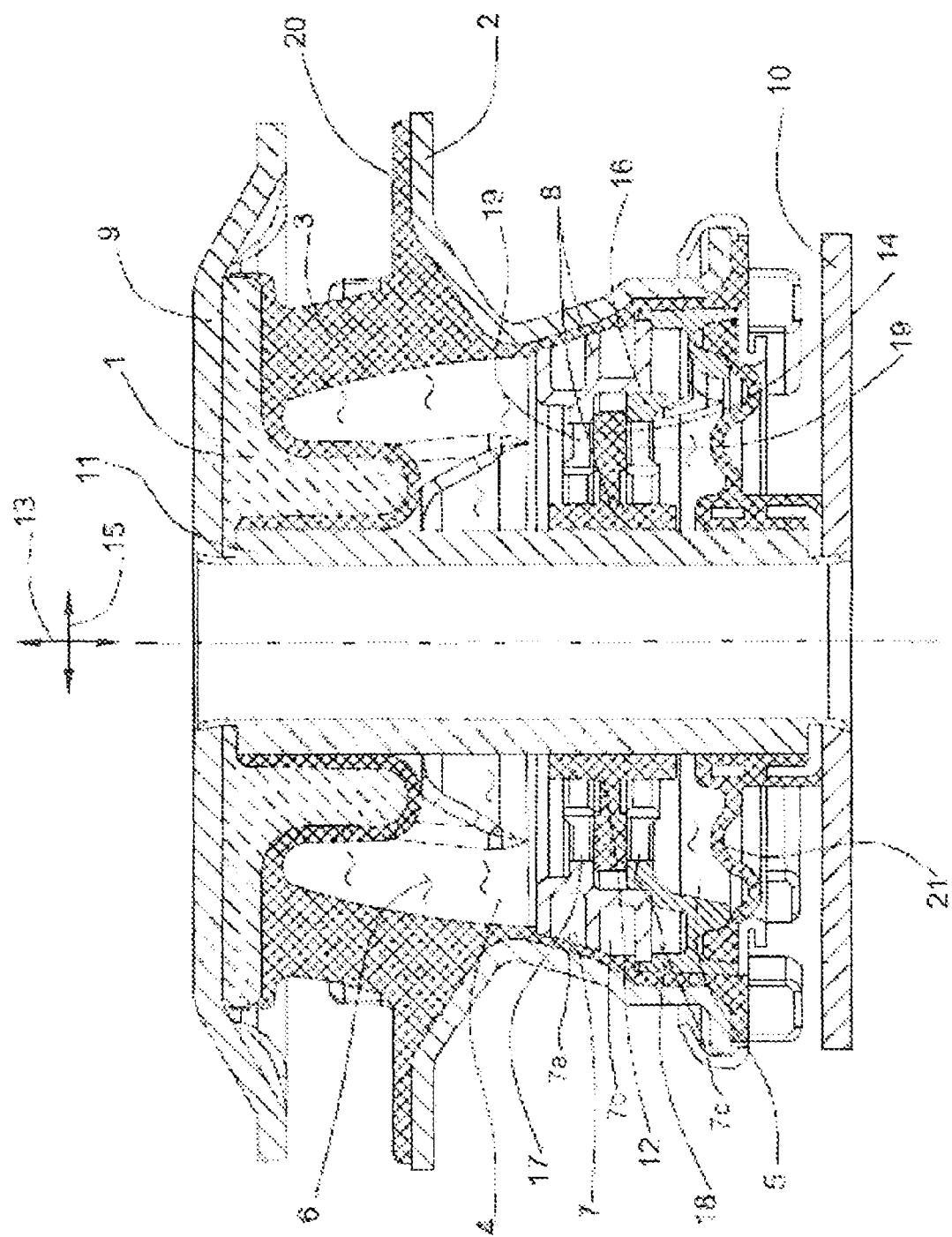

HYDRAULICALLY DAMPING MOUNT AND MOTOR VEHICLE WITH IT

CROSS-REFERENCE TO PRIOR APPLICATION

Priority is claimed to German Patent Application No. DE 10 2011 109 128.2, filed on Aug. 2, 2011, the entire disclosure of which is hereby incorporated by reference herein.

FIELD

The invention relates to a hydraulically damping mount, comprising a support bearing and a seat which are supported on each other by a hollow conical spring element made of an elastomeric material and comprising a working chamber and a compensation chamber that are filled with damping fluid, whereby the working chamber and the compensation chamber are separated from each other on their axially facing sides by means of a partition that has a damping channel via which the chambers are connected to each other so as to convey fluid.

BACKGROUND

Hydraulic damping mounts are generally known and are employed, for instance, as aggregate mounts. In this context, for example, an internal combustion engine is supported on the chassis of a motor vehicle by means of the aggregate mount. In the prior-art aggregate mounts, the support bearing is usually formed by a central core that is arranged on the front on only one side, said core being joined to the spring element. The spring element is supported axially on the other side on an essentially pot-shaped seat that has, for instance, a centrally positioned threaded bolt on its bottom for purposes of attaching the aggregate mount. The partition of the prior-art aggregate mount is configured so as to be disk-shaped and its entire disk-shaped surface can be exposed on both sides in the axial direction to the damping fluid in the working and compensation chambers.

SUMMARY

In an embodiment, the present invention provides a hydraulically damping mount including a support bearing and a seat which are supported on each other by a hollow conical spring element made of an elastomeric material. The support bearing is shaped essentially as a double-T and includes two annular radial flanges that are connected to each other via a centrally positioned connecting tube so as to be adjacent to each other at an axial distance from each other and so as to delimit the mount on a front on both sides. A working chamber and a compensation chamber are filled with damping fluid. The working chamber and the compensation chamber are separated from each other are separated from each other, on respective axially facing sides, via a partition having a damping channel which connects the chambers to each other so as to convey the fluid. The partition is joined to the seat and has an annular shape that surrounds and seals the connection tube.

BRIEF DESCRIPTION OF THE DRAWING

The present invention will be described in even greater detail below based on the exemplary FIG. 1. The invention is not limited to the exemplary embodiment. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 shows a hydraulic damping mount according to an embodiment of the invention.

DETAILED DESCRIPTION

In an embodiment, the invention provides a mount that can also be employed for other applications, especially for applications in which there is a desire or need for a screwed connection that passes through the center of the mount.

In an embodiment, the invention provides that the support bearing is configured so as to be essentially double-T-shaped and to have two annular radial flanges which are adjacent to each other at an axial distance and which delimit the mount on the front on both sides, and it is provided that the radial flanges are connected to each other by means of a centrally positioned connecting tube, and that the partition is configured so as to be annular, so as to surround the connecting tube for purposes of sealing it, and so as to be joined to the seat.

With such a configuration, the mount according to an embodiment of the invention with its double-T-shaped support bearing can be attached to one of the components that is to be uncoupled, and said mount is attached by means of a screwed connection that passes through the center of the mount, while the other component is joined to the seat.

The screwed connection that passes through the center of the mount is needed in some application cases for design reasons, for example, when the passenger compartment of a motor vehicle is to be mounted, so that the component that is to be mounted, for instance, a passenger compartment can be screwed "from below".

The radial flange of the support bearing, which is arranged on the side of the compensation chamber that faces axially away from the working chamber, assumes the function of a stop when the component to be mounted, for example, a passenger compartment of a vehicle, rebounds, especially during a head-on collision.

In order to seal the annular partition along its inner circumference against the outer circumference of the connecting tube, it is provided that the inner circumference of the partition has a membrane that surrounds the connecting tube so as to seal it. In this context, the membrane can be made of a relatively hard rubber or of a relatively softer elastomeric material, or else of a polymeric material, depending on the application case in question. When the material of the membrane is selected, it should be taken into consideration that, on the one hand, the membrane should have a good sealing effect vis-à-vis the connecting tube and, on the other hand, it should also be very durable, also because, according to an advantageous configuration, the membrane surrounds the connecting tube so as to seal it and so that it can execute a relative movement in the axial direction. This relative freedom of movement results from the fact that the membrane, which is a constituent of the partition, is connected by the damping channel to the seat so as to be essentially stationary, and from the fact that the connecting tube, which is a constituent of the support bearing, can move relative to the membrane. A connection between the support bearing and the seat is brought about exclusively by the spring element made of an elastomeric material, with the objective of achieving the best possible vibration uncoupling between the support bearing and the seat. In order for the mount to function well, the membrane has to reliably surround the connecting tube so as to seal it, even when the support bearing and the seat move relative to each other. This is why, on the one hand, the material of which the membrane is made has to be adequately resistant to abrasive wear and tear and, on the other hand, it has to exhibit sufficient elasticity over the course of a prolonged service life.

The membrane can be joined on its outer circumference to the damping channel so as to be essentially liquid-tight. In order to achieve effective damping of vibrations, it is advantageous for the damping fluid in the working chamber and in the compensation chamber to be pumped back and forth through the damping channel as completely as possible. Leaks would have the effect of a bypass between the working chamber and the compensation chamber. Some of the damping fluid would be moved back and forth through the bypass between the working chamber and the compensation chamber, as a result of which it would not move through the damping channel, thus worsening the damping effect.

It can be provided that the outer circumference of the membrane has an annular, radially extending, fastening flange that is joined to the damping channel so that it can execute a relative movement in the axial and/or radial directions. As a result, the mechanical loads exerted onto the fastening flange of the membrane are kept at a low level, even when the support bearing and the seat frequently move relative to each other during the proper use of the mount. Consequently, the membrane and thus also the mount display consistently good properties of use over the course of a prolonged service life. This minimizes the fatigue of the material of which the membrane is made.

According to an advantageous embodiment, it can be provided that the damping channel is configured with at least two levels. It is likewise preferred for the damping channel to be configured with three levels. The damping channel is configured with multiple levels so as to achieve sufficient length and thus a sufficiently large volume of damping fluid inside the damping channel. This can effectively dampen low-frequency, large-amplitude vibrations.

The damping channel can have a forked receptacle that extends radially inwards to hold the fastening flange. The membrane is properly secured in the axial and radial directions by means of this forked receptacle, as a result of which it is always in contact with the outer circumference of the connecting tube with an essentially consistent elastic pre-tensioning. The spatial positioning of the fastening flange in the forked receptacle remains practically constant when the mount is being compressed as well as when it is rebounding.

The receptacle can comprise an upper nozzle disk that is arranged axially with respect to the working chamber as well as a lower nozzle disk that is arranged axially with respect to the compensation chamber, both having perforations. The fastening flange of the membrane can be exposed to damping fluid coming from the axially adjacent chambers through the perforations. Additional high-frequency vibrations inside the mount can be insulated in a manner similar to the membranes in the partitions of aggregate mounts.

The seat and the damping channel are arranged essentially stationary with respect to each other. The damping channel can be sealed off, for example, in that the elastomeric material of which the spring element is made extends along the inner circumference of the seat and brings about a fluid-tight seal on the outer circumference of a damping channel that is radially open towards the outside. Moreover, this also entails the advantage that manufacturing tolerances are compensated for by the elastomer section that extends between the seat and the damping channel. As a result, the mount can be manufactured in a simple and inexpensive manner.

At least one impact buffer can be provided between the support bearing and the seat for purposes of limiting axial movements of the two parts relative to each other. Limiting undesired large axial movements of the support bearing and the seat relative to each other reduces the mechanical load on the spring element, thus minimizing the risk of its being damaged or destroyed. As a result, the mount according to an embodiment of the invention has a long service life. Moreover, the use of an impact buffer in the mount has the advantage that loud impact noises are avoided, even in the case of extreme deflections between the support bearing and the seat.

The impact buffer can be made of an elastomeric material and can be configured in one piece so as to integrally coalesce with the spring element. As a result, the mount has a simple structure involving few parts, which is an outstanding advantage in terms of achieving cost-efficient and simple manufacture.

Moreover, an embodiment of the invention relates to a motor vehicle comprising a passenger compartment and a chassis, whereby the passenger compartment is supported on the chassis via a mount so as to be vibration-uncoupled.

Such vibration-uncoupled mounting systems for the passenger compartments of motor vehicles are generally known. Here, the mounting system comprises mounts that are configured as simple rubber-metal parts.

In an embodiment, the invention provides that the damping of the passenger compartment of a vehicle with respect to the chassis is improved while the motor vehicle is being properly operated.

Towards this end, it is provided that the mounting system comprises at least one mount, as described above. Passenger compartments that are vibration-uncoupled with respect to the chassis are often employed in utility vehicles. For this purpose, it can be provided that the mounting system is formed by four so-called passenger compartment mounts, whereby at least the mounts arranged at the rear end of the passenger compartment—as seen in the driving direction—are hydraulically damping mounts according to an embodiment of the invention. The front passenger compartment mounts can be in the form of conventional rubber-metal mounts although, in order to further improve the properties of use, the possibility exists of configuring the front passenger compartment mounts according to an embodiment of the invention as well.

The FIGURE shows a hydraulically damping mount that is used as a passenger compartment mount for a motor vehicle. In this context, the mount is arranged between the passenger compartment and the chassis of a motor vehicle in order to uncouple vibrations.

The hydraulically damping mount according to an embodiment of the invention comprises a support bearing 1 which is configured to be double-T-shaped. The two radial flanges 9, 10 which are each configured so as to be annular, are joined to the passenger compartment of a motor vehicle, and are rigidly attached to each other by the connecting tube 11. The seat 2 is arranged within the axial distance between the two radial flanges 9, 10, and it is joined to the upper radial flange 9 by means of the hollow conical spring element 3, which is made of an elastomeric material.

Arranged inside the mount are the working chamber 4 and the compensation chamber 5, which are separated from each other by the partition 8 and which are connected to each other so as to convey fluid through the damping channel 7 that is a constituent of the partition 8. The working chamber 4 is essentially delimited by the upper radial flange 9, by the spring element 3 and by the partition 8, while the compensation chamber 5 is formed by the partition 8 and by a sealing membrane 21 that holds volume essentially pressure-less, that is made of a rubber-elastic material, and that is in the form of rolling bellows.

In order to create a screwed connection through the center of the mount, the connecting tube 11 is provided which—in order to separate the working chamber 4 and the compensation chamber 5 from the membrane 12—can execute a relative movement in the axial direction while nevertheless being surrounded so as to be sealed.

The following can be said about the functioning of the mount:

The support bearing 1, which is shaped like a double-T and which comprises the radial flanges 9, and the connecting tube 11 arranged between these radial flanges 9, 10, is joined to the passenger compartment of a motor vehicle. The seat 2, in turn, is attached to the chassis of the motor vehicle. The support bearing 1 and the seat 2 are joined to each other by the spring element 3 so as to be vibration-uncoupled.

If, during proper utilization of the mount, for instance, vibrations in the axial direction 13 are introduced into the mount from the upper radial flange 9 towards the lower radial flange 10, then the upper radial flange 9 moves towards the seat 2 and the spring element 3 is compressed. In this process, the volume of the working chamber 4 is reduced and damping fluid 6 is displaced through the damping channel 7—consisting of three levels 7a-c here—and through the partition 8 in the direction of the compensation chamber 5, whereby the sealing membrane 21 bulges forward axially toward the lower radial flange 10 in order to accommodate the additional volume from the working chamber 4.

When the passenger compartment rebounds with respect to the chassis, the damping fluid 6 that had been pumped into the compensation chamber 5 during the compression procedure is conveyed through the three-level damping channel 7 back to the working chamber 4.

The vibrations introduced into the mount are damped when the damping fluid 6 is displaced through the damping channel 7.

When the support bearing 1 moves relative to the seat 2 in the axial direction 13 as well as in the radial direction 15, it must be ensured that the partition 8 always surrounds the connecting tube 11 with the membrane 12 so as to create a seal.

The inner circumferential surface of the membrane 12 can move axially relative to the outer circumferential surface of connecting tube 11. This is why the membrane 12 is preferably made of a material that, on the one hand, provides a good seal and, on the other hand, only undergoes slight wear and tear, even during frequent movement relative to the connecting tube 11. The membrane 12 can be made, for instance, of a relatively hard rubber.

When the support bearing 1 moves radially relative to the seat 2, the fastening flange 14 of the membrane 12 moves back and forth in the radial direction 15 inside the forked receptacle 16, which is a one-piece constituent of the damping channel 7, whereby the fastening flange 14, depending on the application case in question, can be moved in the axial direction 13 and/or in the radial direction 15 for purposes of insulating high-frequency vibrations, while being nevertheless arranged so as to be essentially fluid-tight in the forked receptacle 16. The receptacle 16 includes an upper nozzle disk 17 that is arranged axially with respect to the working chamber 4 and a lower nozzle disk 18 that is arranged axially with respect to the compensation chamber 5, each of the disks including perforations 19.

In the embodiment shown here, an impact buffer 20 is provided in order to limit undesired large axial deflection movements of the support bearing 1 relative to the seat 2, whereby the impact buffer 20 is configured in one piece so as to integrally coalesce with the spring element 3.

Thanks to the impact buffer 20, it is possible to prevent, on the one hand, undesired large mechanical loads on the spring element 3 and, on the other hand, impact noises that would be created in the absence of the impact buffer 20 when the support bearing 1 strikes the seat 2.

What is claimed is:

1. A hydraulically damping mount, comprising:
   a support bearing and a seat which are supported on each other by a hollow conical spring element made of an elastomeric material, the support bearing including two annular radial flanges disposed respectively at a first side and a second side of the mount and connected to each other via a centrally positioned connecting tube so as to be adjacent to each other at an axial distance from each other and so as to delimit the mount on the first side and the second side; and
   a working chamber and a compensation chamber containing damping fluid, the working chamber and the compensation chamber being separated from each other, on respective axially facing sides, via a partition having a damping channel which connects the chambers to each other so as to convey the damping fluid, the partition being joined to the seat and having an annular shape that surrounds and seals the connecting tube, wherein the damping channel has at least two levels.

2. The mount according to claim 1, wherein an inner circumference of the partition has a membrane that surrounds the connecting tube so as to seal it.

3. The mount according to claim 2, wherein the membrane is configured to allow a relative movement of the connecting tube in an axial direction.

4. The mount according to claim 2, wherein an outer circumference of the membrane is joined to the damping channel.

5. The mount according to claim 2, wherein an outer circumference of the membrane has an annular, radially extending, fastening flange that is joined to the damping channel such that the fastening flange is configured to have a relative movement in at least one of an axial and a radial direction.

6. The mount according to claim 1, wherein the damping channel has a forked receptacle that extends radially inwards to hold the fastening flange.

7. The mount according to claim 6, wherein the receptacle includes an upper nozzle disk that is arranged axially with respect to the working chamber and a lower nozzle disk that is arranged axially with respect to the compensation chamber, each of the disks including perforations.

8. The mount according to claim 1, wherein the seat and the damping channel are disposed so as to be essentially stationary with respect to each other.

9. The mount according to claim 1, further comprising at least one impact buffer disposed between the support bearing and the seat so as to limit axial movements of the support bearing and the seat relative to each other.

10. The mount according to claim 9, wherein the at least one impact buffer is formed using an elastomeric material in one piece so as to integrally coalesce with the spring element.

11. A hydraulically damping mount, comprising:
    a support bearing and a seat which are supported on each other by a hollow conical spring element made of an elastomeric material, the support bearing including two annular radial flanges disposed respectively at a first side and a second side of the mount and connected to each other via a centrally positioned connecting tube so as to be adjacent to each other at an axial distance from each other and so as to delimit the mount on the first side and the second side; and a working chamber and a compensation chamber containing damping fluid, the working chamber and the compensation chamber being separated from each other, on respective axially facing sides, via a partition having a damping channel which connects the chambers to each other so as to convey the damping fluid, the partition being joined to the seat and having an annular shape that surrounds and seals the connecting tube, wherein the damping channel has a forked receptacle that extends radially inwards to hold the fastening flange.

12. The mount according to claim 11, wherein the receptacle includes an upper nozzle disk that is arranged axially with respect to the working chamber and a lower nozzle disk that is arranged axially with respect to the compensation chamber, each of the disks including perforations.

13. The mount according to claim 1, wherein the support bearing has a shape essentially of a double-T.

14. The mount according to claim 11, wherein the support bearing has a shape essentially of a double-T.

* * * * *